United States Patent

Enomoto et al.

[11] Patent Number: 4,803,023
[45] Date of Patent: Feb. 7, 1989

[54] METHOD FOR PRODUCING A WOOD-TYPE GOLF CLUB HEAD

[75] Inventors: Kōichi Enomoto; Tatsuo Nakanishi, both of Hamamatsu, Japan

[73] Assignee: Yamaha Corporation, Tokyo, Japan

[21] Appl. No.: 16,242

[22] Filed: Feb. 19, 1987

Related U.S. Application Data

[63] Continuation-in-part of Ser. No. 739,029, May 29, 1988, abandoned.

[30] Foreign Application Priority Data

Sep. 17, 1985 [JP] Japan .................. 60-205093

[51] Int. Cl.$^4$ .................. B29D 27/00; A63B 53/04
[52] U.S. Cl. .................. 264/45.4; 264/46.6; 273/167 H; 273/172; 273/171
[58] Field of Search .................. 273/167 H, 171, 171, 273/174, 169, 167 F, 167 A; 264/45.4, 46.6

[56] References Cited

U.S. PATENT DOCUMENTS

| | | | |
|---|---|---|---|
| 3,582,081 | 6/1971 | Caplan | 273/174 |
| 4,043,563 | 8/1977 | Churchward | 273/172 |
| 4,313,607 | 2/1982 | Thompson | 273/167 H |
| 4,451,041 | 5/1984 | Hayashi et al. | 273/167 H |
| 4,489,945 | 12/1984 | Kobayashi | 273/172 |
| 4,553,755 | 11/1985 | Yamada | 273/171 |

FOREIGN PATENT DOCUMENTS

| | | | |
|---|---|---|---|
| 51-21436 | 7/1976 | Japan | 273/167 H |
| 397252 | 8/1933 | United Kingdom | 273/169 |

Primary Examiner—George J. Marlo
Attorney, Agent, or Firm—Sachs & Sachs

[57] ABSTRACT

In production of a wood-type golf club head having a FRP shell and a foam resin core, a seat hole is formed in the sole portion of the club head and closed by a support plate having a threaded through hole at the center of gravity thereof; foamable resin is infused into the FRP shell cavity in the form of fine beads or solution, a plug as a weight balance adjusting piece is screwed into the support plate in direct contact with the foam resin core for secure holding of the weight balance adjusting piece during use of the club.

5 Claims, 2 Drawing Sheets

METHOD FOR PRODUCING A WOOD-TYPE GOLF CLUB HEAD

BACKGROUND OF THE INVENTION

This is a continuation-in-part application of a copending application Ser. No. 739,029 filed on 29th May, 1985, now abandoned.

The present invention relates to a method for producing a wood-type golf club head, and more particularly relates to an improvement in the method of production of a wood-type golf club head made of an FRP (Fiber reinforced plastic) shell and a foam resin core.

One example of such a golf club head has already been proposed in Japanese Patent Publication No. 51-21436, in which a foamable synthetic resin is infused into the cavity of an FRP shell. For balance adjustment, one or more holes are formed in the club head to receive a mass piece or pieces. This method of adjustment is well known in wooden golf club heads of a solid construction.

In the case of the golf club head disclosed in Japanese Patent Publication No. 51-21436, one or more screw holes are formed directly in the FRP shell for securement of a mass piece or pieces. The thin construction of the FRP shell prevents stable and reliable securement of the mass pieces. In particular, the mass pieces can not withstand the impulsive shock when the club strikes a golf ball and are therefore easily loosened. As a consequence, securing the position of the mass piece or pieces is uncertain no stable balance adjustment can be maintained and the function of the club is compromised.

SUMMARY OF THE INVENTION

It is the object of the present invention to produce a wood-type golf club head whose balance can be easily adjusted and stably maintained even when subjected to the shock associated with use of the club.

In accordance with the basic aspect of the present invention, a threaded through hole is formed in a support plate secured in a seat hole in the bottom section of a hollow FRP shell, formable resin, in the form of a solution or of fine beads, is infused in the cavity of the FRP shell via the threaded through hole, and foaming and hardening of the foamable resin, is permitted after screwing a plug into the threaded through hole.

FIG. 1 is a side view, partly in section, of one example of the golf club head produced in accordance with the method of the present invention, and FIGS. 2 through 4 are side views, partly in section, for showing sequential operational steps is the production method in accordance with the present invention. FIG. 2 shows the placement of the support plate into the seat hole which has been formed in the FRP shell.

DESCRIPTION OF THE PREFERRED EMBODIMENTS

Figure 1:
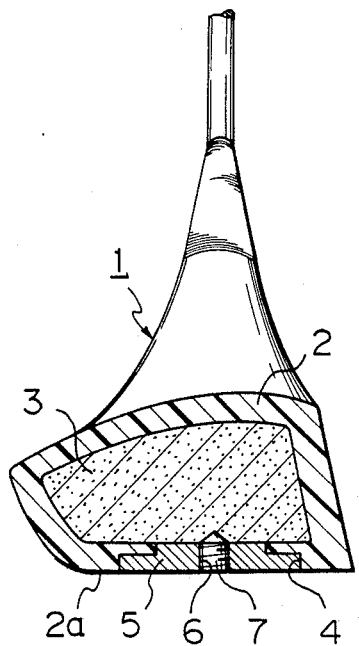

One example of a golf club head produced in accordance with the method of the present invention is shown in FIG. 1, in which the golf club head 1 includes a FRP shell 2 and a foam resin core 3 which fills the cavity of the FRP shell 2. A seat hole 4 is formed in the bottom section 2a of the FRP shell 2 which defines the sole side of the golf club head 1, and a support plate 5 made of metal such as brass is securedly received in the seat hole 4. A threaded through hole 6 is formed in the support plate 5 at the center of gravity and a plug, which is of the same material as the support plate 5, is screwed in the threaded through hole 6.

Figure 2:
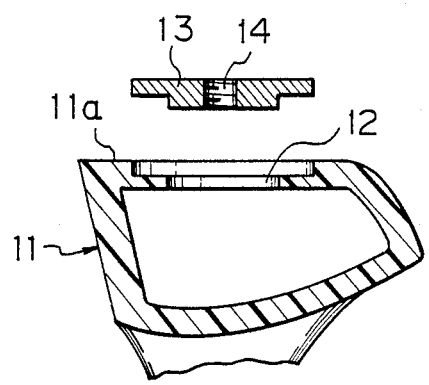
Figure 3:
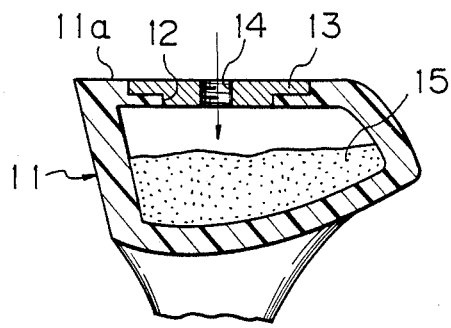
FIG. 3 depicts the infusion of foamable resin into the hollow cavity of the FRP shell after the support plate has been installed into the seat hole.
Figure 4:
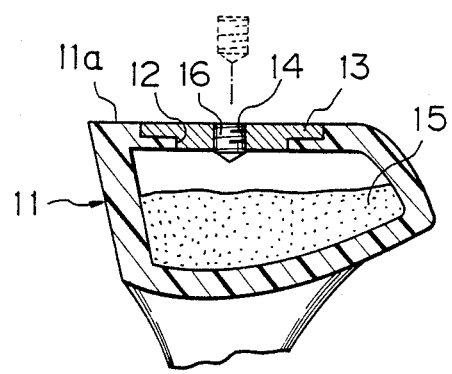
FIG. 4 shows the installation of the plug into the threaded hole in the support plate after infusion of foamable resin, but before expansion of the resin.

One example of a production method in accordance with the present invention is shown in FIGS. 2 through 4, in which a foamable resin solution is used. First, a crude club head 11 made of a hollow FRP shell is prepared by a known method such as hand lay-up shaping, two piece pressure joint shaping or injection shaping. Next, as shown in FIG. 2, a seat hole 12 is formed in the bottom section 11a of the crude club head 11 and a metallic support plate 13 is secured in position in the seat hole 12. A threaded through hole 14 is formed in the support plate 13 at a position corresponding to its center of gravity.

After securement of the support plate 13, a solution of foamable resin of a prescribed amount is infused into the cavity of the crude club head 11 as shown in FIG. 3, and a plug 16 is screwed into the threaded through hole as shown in FIG. 4. At this time, foaming and hardening of the foamable resin is developed. Thus, foamed and hardened foam resin uniformly fills the cavity of the FRP shell.

When the foamable resin is infused into the cavity of the crude club head 11, the foamable resin may be used in the form of fine beads rather than in solution form. Use of such fine beads of foamable resin allows easier handling of the material and simpler processing than use of solution.

The volume of the cavity formed in the crude club head 11 should preferably be in a range from 20 to 90 cm$^3$. The adjustable apparent specific gravity of the foam resin should preferably be in a range from 0.05 to 0.45 when no filler is used, and from 0.05 to 1.5 when any filler is used. Powders of barium sulfate and alumina are preferably used for the fillers.

In accordance with the present invention, the mass piece, i.e. the foam resin, uniformly filled in the cavity of the FRP shell assures stable maintenance of the center of gravity of the club head. As the mass made of foam resin is bonded securely to the inner wall of the FRP shell, the club head well endures the impulsive shock experienced when golf balls are struck. Proper adjustment of the specific gravity of the infused foam resin forming the mass piece produces high and crisp sounds at shots. Further, the use of plugs of different weight enables the user to enhance balance. In addition, since the plug, as a weight balance adjusting piece, is screwed into the support plate in directed contact with the resin core, the mass piece can be strongly held on the body of the club head to well withstand the impulsive shock experienced when golf balls are struck.

We claim:

1. Method for producing a wood-type golf club head comprising the steps of
   preparing a FRP shell having a cavity and defining a bottom section,
   forming a seat hole in said bottom section of said FRP shell,
   securedly closing said seat hole with a support plate having a threaded through hole at the position of the center of gravity thereof, infusing foamable resin into said cavity of said FRP shell via said threaded through hole,
screwing a plug of a selected weight into said threaded through hole, and
developing foaming and hardening of said foamable resin for conversion into foam resin.

2. Method as claimed in claim 1 in which
said step of infusing includes infusing solution of said foamable resin.

3. Method as claimed in claim 1 in which said step of infusing includes infusing beads of said foamable resin.

4. Method as claimed in claim 1, 2 or 3 in which
the apparent specific gravity of said foam resin is in a range from 0.05 to 0.45.

5. Method as claimed in claim 1, 2 or 3 in which
a filler is added to said foam resin and the apparent specific gravity of said foam resin is in a range from 0.05 to 1.5.

* * * * *